Sept. 28, 1926.
A. D. HUDSON
TREE DIGGER FOR NURSERIES
Filed Feb. 9, 1926
1,601,121
2 Sheets-Sheet 1
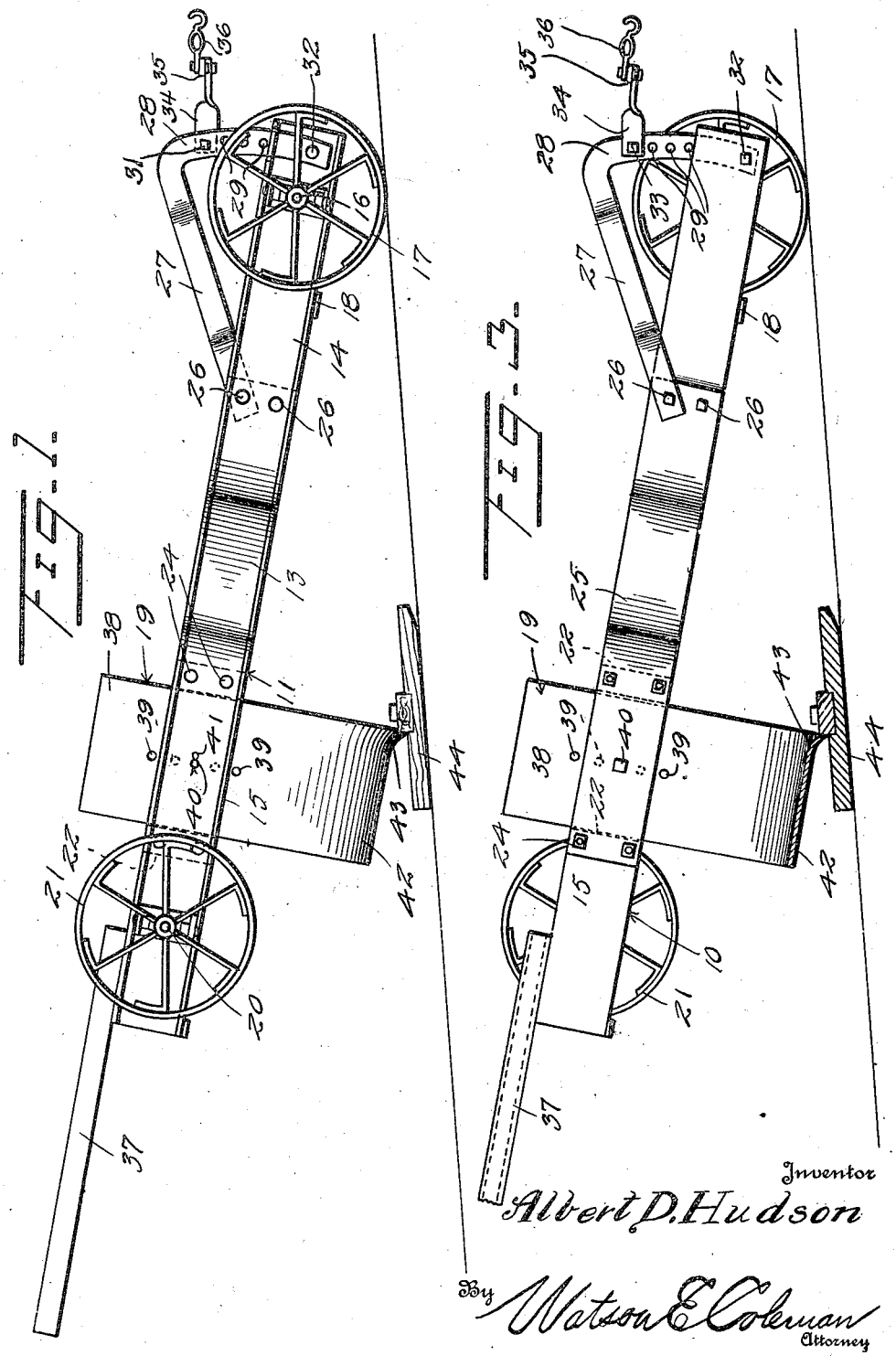
Inventor
Albert D. Hudson
By Watson E. Coleman
Attorney

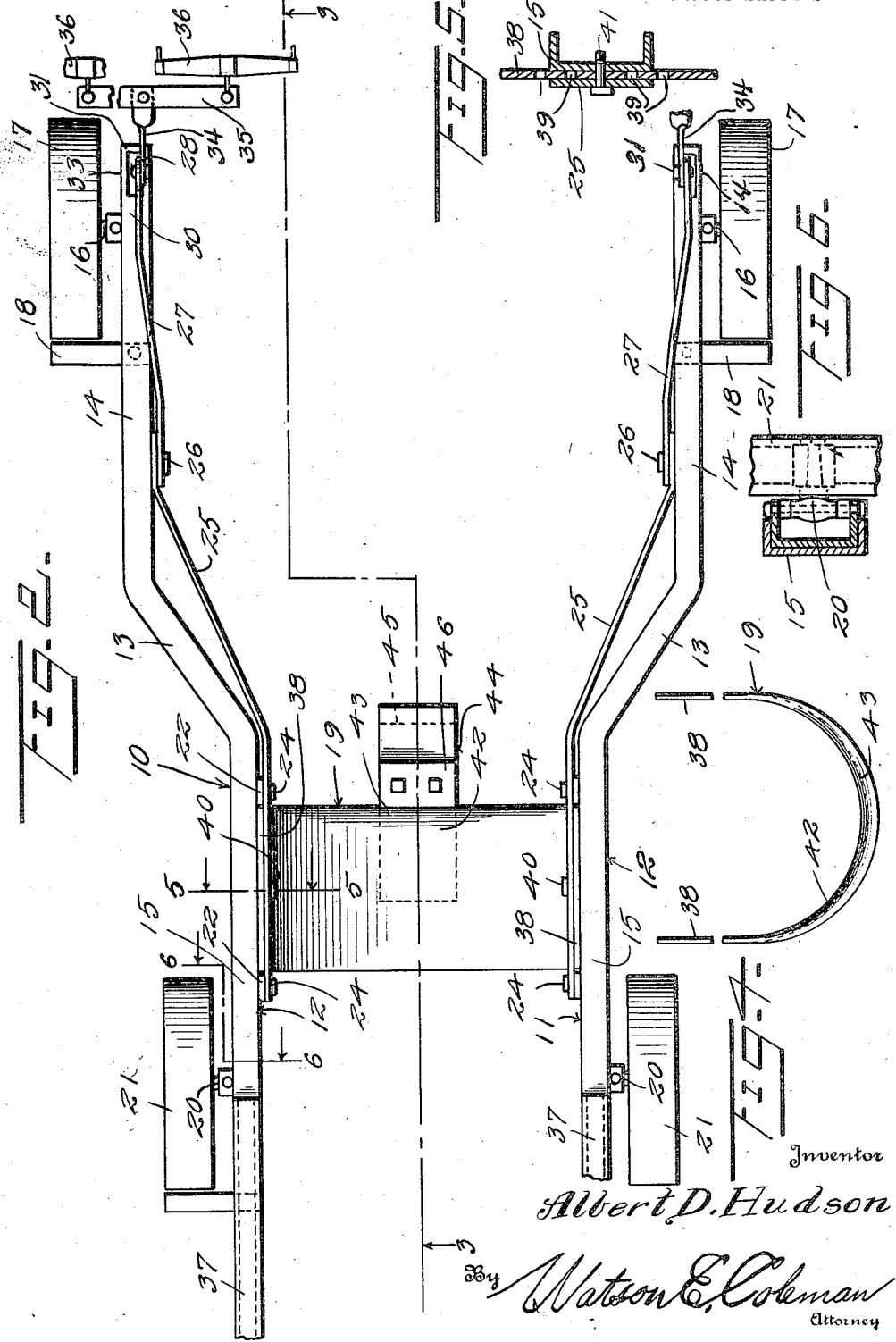

Patented Sept. 28, 1926.

1,601,121

UNITED STATES PATENT OFFICE.

ALBERT D. HUDSON, OF TANGENT, OREGON.

TREE DIGGER FOR NURSERIES.

Application filed February 9, 1926. Serial No. 87,152.

This invention relates to tree diggers for nurseries and more particularly to a device for loosening the soil about and beneath the roots of young trees so that they may be readily withdrawn therefrom.

In large nurseries, it is often necessary that the soil be loosened about the roots of many thousand trees. The trees of a given lot generally include trees, the roots of which attain different depths for a given period of growth, thus necessitating a device which is readily adjustable as to the depth of working of the ground beneath the surface. Often trees in the same row will be of different character and it is quite a common occurrence that the trees in different rows are of different character. It is important that the device be so constructed that it does not in any way engage against the trees of the row and that it be readily transported from place to place. It is furthermore important that a structure be provided wherein the horses pulling the digger are evenly hitched to the digger as otherwise there is a tendency to side-draft or lurching of the digger which is liable to cause considerable damage to the trees of a row. Accordingly, an important object of this invention is to provide a device of this character which is readily adjustable as to the depth of the ground which is worked thereby which provides ample clearance for the trees of a row, the roots of which are being freed and which has means for attaching the draft animals thereto in such a manner that strain will be evenly applied to the digger.

A further object of the invention is to provide a device of this character which may be relatively cheaply manufactured, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation of a tree digging device constructed in accordance with my invention in readiness for transportation from place to place;

Figure 2 is a plan view thereof;

Figure 3 is a section on the line 3—3 of Figure 2;

Figure 4 is a front elevation of the shovel;

Figure 5 is a section on the line 5—5 of Figure 2;

Figure 6 is a section on the line 6—6 of Figure 2.

Referring now more particularly to the drawings, the digger includes a pair of side members 10 and 11 which are exactly similar in structure with the exception of the fact that one is right and the other left hand. Each side member consists of a length of channel iron 12 offset intermediate its ends, as at 13, to provide the digger with a relatively wide front and restricted rear sections. This offsetting divides the channel iron side members into two sections 14 and 15, which will hereinafter be referred to as the front and rear sections of the side members.

The front section of each side member has welded or otherwise secured thereto adjacent the forward end thereof a spindle 16 upon which is rotatably mounted a supporting wheel 17. Secured to the channel iron member adjacent this spindle is a scraper 18 for engaging the periphery of the wheel 17 to keep the same free from collected soil which would tend to vary the depth of the digging or cutting blade 19, hereinafter to be more particularly referred to. The outer face of each rear section 15 has similarly secured thereto a second spindle 20 upon which is mounted a rear supporting wheel 21. The supporting wheels 17 and 21 are preferably provided with ball bearings to reduce the resistance of the device to traction. Secured to the inner face of each rear section adjacent the forward end thereof are spaced vertically extending guide blocks 22 and through these guide blocks and the web of the channel, openings are formed for the passage of securing elements 24 which also hold the rear end of a brace 25. The forward end of each brace is secured to the front section 14 at the approximate center of the inner face thereof by bolts 26, one of which forms a mounting for a forwardly extending arm 27 having at its forward end an arcuate angular extension 28 provided with a series of openings 29. In the upper channel 30 of each channel iron at the forward end thereof an opening 31 is formed through which this arcuate extension is directed and through the web of the channel, a bolt 32 is directed for engagement with the lower end of this arcuate extension. Selectively engageable in the openings 29 of each arcuate extension is a pivot 33 of a link 34 to the forward end of which is adjustably pivotally connected an equalizer bar 35 to opposite ends of which are connected single trees 36. The rear ends of the channel irons are provided with extension handles 37 which are preferably welded at their forward ends to the upper flanges of the channel irons. The blade 19 hereinbefore referred to is substantially U-shaped and forms the sole means of connection between the side members 10 and 11. The upper ends of the arms 38 of this blade are of such width as to fit closely between adjacent faces of the guides 22 and of such thickness as to fit closely between the adjacent faces of the brace 25 and the rear sections 15 of the side members. Each arm is provided centrally with a vertically extending series of openings 39 and the brace 25 and web of the channel iron are provided with aligned openings for the passage of a headed element 40 which is secured in position by means of cotter pins 41 or some similar readily removable retaining elements. The bight portion 42 of the blade is sharpened and is preferably downwardly slightly curved at its cutting edge, as illustrated more particularly at 43.

In the use of the device, it will, of course, be understood that draft animals are attached to the equalizers, one animal being attached to each single tree and there being two animals operating in each middle at the opposite sides of the rows of trees, the roots of which are being loosened. Since the wheels form a support for the side members and provide a limit for their movement toward the ground, it follows that the adjustment of the blade 19 with relation to the side members will control the depth at which the ground is loosened. It will be obvious that this depth may be readily changed at any time by simply changing the pin or headed element 40 from one to another of the openings provided in the arms of the blade. Since the blade is rigidly held against deflection with relation to the side members by the vertical guides 22 and by its engagement between the braces and the side members, it follows that the side members will be rigid to the blade and that accordingly an even operation of the motor is assured. This is important as the use of a structure depending upon an overhead frame for holding the side members rigidly in alignment is impractical since the trees of a nursery often attain the height of ten feet and accordingly could hardly be bridged by a rigid structure without making this structure of such weight as to be entirely impractical. A shoe 44 may be provided for use in supporting the blade while transporting the device from place to place.

It will, of course, be obvious that the construction hereinbefore set forth is obviously capable of a certain range of change and modification without materially departing from the spirit of the invention and I accordingly do not limit myself to such specific structure except as hereinafter claimed.

I claim:—

1. A tree digger comprising side members, said side members being offset adjacent their forward ends to increase the distance between such forward ends, vertical guides carried by the inner faces of the side members rearwardly of the offsets, members abutting the guides and rigidly secured thereto, a cutting blade substantially U-shaped in form and having the upper ends of the arms thereof closely fitting between said vertical guides and between said members and the adjacent faces of the side members and a removable securing element directed through each member, the associated arm and side member for securing the blade in position thereon.

2. A tree digger comprising side members, said side members being offset adjacent their forward ends to increase the distance between such forward ends, vertical guides carried by the inner faces of the side members rearwardly of the offsets, members abutting the guides and rigidly secured thereto, a cutting blade substantially U-shaped in form and having the upper ends of the arms thereof closely fitting between said vertical guides and between said members and the adjacent faces of the side members and a removable securing element directed through each member, the associated arm and side member for securing the blade in position thereon, the forward ends of said abutting members extending forwardly and being secured to said side members approximately midway between said offset portion and the forward ends thereof to thereby provide a brace for such forward ends.

3. A tree digger comprising side members, said side members being offset adjacent their forward ends to increase the distance between such forward ends, vertical guides carried by the inner faces of the side members rearwardly of the offsets, members abutting the guides and rigidly secured thereto, the forward ends of said members being secured to their side members intermediate the forward ends thereof and the offset whereby to brace the same, a cutting blade substantially U-shaped in form and having the upper ends of the arms thereof closely fitting between said vertical guides and between said members and the adjacent faces of the side members and a removable securing element directed through each member, the associated arm and side member for securing the blade in position thereon.

In testimony whereof I hereunto affix my signature.

ALBERT D. HUDSON.